(12) United States Patent
Wang et al.

(10) Patent No.: US 10,283,072 B2
(45) Date of Patent: May 7, 2019

(54) PIXEL CIRCUIT AND DRIVING METHOD THEREOF, DISPLAY PANEL AND DISPLAY DEVICE

(71) Applicant: BOE TECHNOLOGY GROUP CO., LTD., Beijing (CN)

(72) Inventors: Yu Wang, Beijing (CN); Fei Yang, Beijing (CN); Yue Wu, Beijing (CN); Quanhu Li, Beijing (CN); Song Meng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/565,907

(22) PCT Filed: May 4, 2017

(86) PCT No.: PCT/CN2017/083059
§ 371 (c)(1),
(2) Date: Oct. 12, 2017

(87) PCT Pub. No.: WO2018/014625
PCT Pub. Date: Jan. 25, 2018

(65) Prior Publication Data
US 2018/0315392 A1 Nov. 1, 2018

(51) Int. Cl.
*G09G 3/38* (2006.01)
*G02F 1/163* (2006.01)

(52) U.S. Cl.
CPC ............. *G09G 3/38* (2013.01); *G02F 1/163* (2013.01); *G02F 2001/1635* (2013.01);
(Continued)

(58) Field of Classification Search
CPC combination set(s) only.
See application file for complete search history.

(56) References Cited

U.S. PATENT DOCUMENTS

2003/0030603 A1 2/2003 Shimoda
2005/0068279 A1 3/2005 Hirota et al.
(Continued)

FOREIGN PATENT DOCUMENTS

CN 1934615 A 3/2007
CN 101620354 A 1/2010
(Continued)

OTHER PUBLICATIONS

First Office Action for Chinese Patent Application No. 201610587130.9 dated Jan. 12, 2018.
(Continued)

*Primary Examiner* — Roberto W Flores
(74) *Attorney, Agent, or Firm* — Calfee, Halter & Griswold LLP

(57) ABSTRACT

A pixel circuit is provided which includes a data writing module, a drive module, a control module and an electrochromic device. The data writing module provides a data signal to the control terminal of the drive module under the control of a first control signal. The drive module drives the electrochromic device for color development or color fading according to a power supply voltage signal under the control of the data signal. The control module controls the conduction between the drive module and the electrochromic device on the basis of a second control signal, and the control module controls the conduction so that the conduction is realized later than the change in the power supply voltage signal. The pixel circuit effectively removes interference of the power supply voltage signal, avoids display fluctuations caused by the change in the power supply voltage signal, and further improves the display effect.

18 Claims, 5 Drawing Sheets

(52) U.S. Cl.
CPC .............. *G09G 2300/0439* (2013.01); *G09G 2300/0809* (2013.01); *G09G 2300/0866* (2013.01); *G09G 2310/0262* (2013.01); *G09G 2310/0275* (2013.01)

(56) References Cited

U.S. PATENT DOCUMENTS

| | | | |
|---|---|---|---|
| 2005/0083270 A1* | 4/2005 | Miyazawa | G09G 3/3233 345/76 |
| 2005/0212448 A1* | 9/2005 | Shibusawa | G09G 3/3233 315/169.3 |
| 2007/0128583 A1* | 6/2007 | Miyazawa | G09G 3/3233 434/433 |
| 2010/0001946 A1 | 1/2010 | Murayama et al. | |
| 2011/0234563 A1* | 9/2011 | Kim | G09G 3/3433 345/211 |
| 2012/0242642 A1 | 9/2012 | Yamazaki et al. | |
| 2014/0192037 A1* | 7/2014 | Chung | G09G 3/2022 345/212 |
| 2014/0368487 A1 | 12/2014 | Chang et al. | |
| 2015/0077316 A1* | 3/2015 | Sato | G09G 3/3208 345/77 |
| 2017/0124968 A1* | 5/2017 | Shima | G02F 1/133512 |
| 2017/0169789 A1 | 6/2017 | Liao et al. | |
| 2017/0193879 A1 | 7/2017 | Wang | |
| 2018/0005570 A1 | 1/2018 | Wang | |

FOREIGN PATENT DOCUMENTS

| | | |
|---|---|---|
| CN | 102693691 A | 9/2012 |
| CN | 104916266 A | 9/2015 |
| CN | 105405399 A | 3/2016 |
| CN | 105427792 A | 3/2016 |
| CN | 105976788 A | 9/2016 |

OTHER PUBLICATIONS

Search Report for International Application No. PCT/CN2017/063059 dated Aug. 2, 2017.

* cited by examiner in the colour development stage, a data writing module providing a data signal outputted from a data signal terminal to the control terminal of a drive module under the control of a first control signal outputted from a first control signal terminal; the drive module providing a power supply voltage signal outputted from a power supply voltage signal terminal to the input terminal of a control module under the control of the data signal so as to drive an electrochromic device for colour development; and a control module controlling the conduction between the drive module and the electrochromic device on the basis of a second control signal outputted from a second control signal terminal, the control module controlling the conduction so that the conduction is realized later than the change in the power supply voltage signal; ⟶ S601 in a colour fading stage, the data writing module providing the data signal outputted from the data signal terminal to the control terminal of the drive module under the control of the first control signal outputted from the first control signal terminal; the drive module providing the power supply voltage signal outputted from the power supply voltage signal terminal to the input terminal of the control module under the control of the data signal so as to drive the electrochromic device for colour fading; and the control module controlling the conduction between the drive module and the electrochromic device on the basis of the second control signal outputted from the second control signal terminal, the control module controlling the conduction so that the conduction is realized later than the change in the power supply voltage signal. ⟶ S602

Fig.6

PIXEL CIRCUIT AND DRIVING METHOD THEREOF, DISPLAY PANEL AND DISPLAY DEVICE

RELATED APPLICATIONS

The present application is the U.S. national phase entry of PCT/CN2017/083059 with an International filing date of May 4, 2017, which claims the benefit of Chinese Application No. 201610587130.9, filed on Jul. 22, 2016, the entire disclosures of which are incorporated herein by reference.

TECHNICAL FIELD

The present disclosure relates to the field of display technology, and more particularly to a pixel circuit and a driving method thereof, a display panel and a display device.

BACKGROUND ART

With the rapid development of display technology, display devices are increasingly widely applied, such as mobile phones, laptops, TVs, onboard displays and electronic tag displays used in supermarkets. However, the display device usually uses a liquid crystal display (LCD) which needs a backlight for liquid crystal display, and the use of backlight results in high power consumption of the display device during display. In order to decrease the power consumption during display, an electrochromic display (ECD) is introduced and widely applied. Electrochromism (EC) is the special phenomenon in which some materials produce a reversible change between a low transmittance chromatic state and a high transmittance achromatic state under the action of an external electric field.

Currently, electrochromic devices (ECDs) manufactured on the basis of the EC technology have been widely used in the fields like lighting control of intelligent buildings, large area outdoor digital and graphic display, vehicle reflectivity adjustable rearview mirrors and aircraft discoloration windows. A conventional ECD display panel comprises a plurality of pixel units formed of an EC material and an ECD pixel circuit for providing a driving voltage for the pixel units. Each pixel unit displays a colour under the action of the driving voltage. The colour display process can be a colour development process or a colour fading process. In the colour development process, the transmittance of the pixel unit is gradually lowered such that the displayed colour becomes darker gradually; to the contrary, in the colour fading process, the transmittance of the pixel unit is gradually increased such that the displayed colour becomes lighter gradually. By adjusting the switch of the pixel unit between the colour development process and the colour fading process, the ECD display panel is able to demonstrate a colourful display effect.

However, the voltage characteristic and capacitance characteristic of the ECD pixel circuit decide that when an ECD is driven by a conventional display driving method, a display panel may have a poor-quality display due to the change in the power supply voltage signal in the pixel circuit.

SUMMARY OF THE INVENTION

Thus, it is desired to provide a pixel circuit and a driving method thereof, a display panel and a display device so as to effectively remove interference of the power supply voltage signal, avoid display fluctuations caused by the change in the power supply voltage signal, and further improve the display effect.

According to one aspect, there is provided a pixel circuit. The pixel circuit comprises a data writing module, a control module, a drive module and an electrochromic device. The control terminal of the data writing module is connected with a first control signal terminal so as to receive a first control signal, the input terminal thereof is connected with a data signal terminal so as to receive a data signal, and the output terminal thereof is connected with the control terminal of the drive module. The data writing module is configured to provide the data signal for the control terminal of the drive module under the control of the first control signal. The input terminal of the drive module is connected with a power supply voltage signal terminal so as to receive a power supply voltage signal, and the drive module is configured to drive the electrochromic device for colour development or colour fading according to the power supply voltage signal under the control of the data signal. The control terminal of the control module is connected with a second control signal terminal so as to receive a second control signal, the input terminal thereof is connected with the output terminal of the drive module, and the output terminal thereof is connected with one end of the electrochromic device. The other end of the electrochromic device is grounded. The control module is configured to control the conduction between the drive module and the electrochromic device on the basis of the second control signal, and the control module controls the conduction so that the conduction is realized later than the change in the power supply voltage signal. In an embodiment, the display period of the pixel circuit comprises a colour development stage and a colour fading stage, during which the power supply voltage signal is respectively maintained at a corresponding potential to realize colour development and colour fading.

In an embodiment, the power supply voltage signal is maintained at a low potential in the colour development stage and at a high potential in the colour fading stage.

In an embodiment, the data signal and the first control signal are converted into a switch-on potential at a time when the colour development stage and the colour fading stage get started.

In an embodiment, the second control signal is converted into a switch-on potential in a predetermined time after the colour development stage and the colour fading stage get started.

In an embodiment, the predetermined time is half of the duration in which the first control signal is maintained at the switch-on potential.

In an embodiment, the data writing module comprises a first switching transistor, wherein the gate of the first switching transistor is the control terminal of the data writing module, the source thereof is the input terminal of the data writing module, and the drain thereof is the output terminal of the data writing module.

In an embodiment, the control module comprises a second switching transistor, wherein the gate of the second switching transistor is the control terminal of the control module, the source thereof is the input terminal of the control module, and the drain thereof is the output terminal of the control module.

In an embodiment, the drive module comprises a third switching transistor and a capacitor, wherein the gate of the third switching transistor is the control terminal of the drive module, the source thereof is the input terminal of the drive module, and the drain thereof is the output terminal of the drive module. Both terminals of the capacitor are electrically connected to the gate and the source of the third switching transistor, respectively.

In an embodiment, the first switching transistor, the second switching transistor and the third switching transistor are all N-type transistors or P-type transistors.

According to another aspect, there is also provided a display panel comprising any pixel circuit as stated above.

According to a further aspect, there is also provided a display device comprising the display panel.

According to a yet aspect, there is also provided a method for driving any pixel circuit as stated above. The method comprises the steps of: in the colour development stage, a data writing module providing a data signal outputted from a data signal terminal to the control terminal of a drive module under the control of a first control signal outputted from a first control signal terminal; the drive module providing a power supply voltage signal outputted from a power supply voltage signal terminal to the input terminal of a control module under the control of the data signal so as to drive an electrochromic device for colour development; and a control module controlling the conduction between the drive module and the electrochromic device on the basis of a second control signal outputted from a second control signal terminal, the control module controlling the conduction so that the conduction is realized later than the change in the power supply voltage signal; in a colour fading stage, the data writing module providing the data signal outputted from the data signal terminal to the control terminal of the drive module under the control of the first control signal outputted from the first control signal terminal; the drive module providing the power supply voltage signal outputted from the power supply voltage signal terminal to the input terminal of the control module under the control of the data signal so as to drive the electrochromic device for colour fading; and the control module controlling the conduction between the drive module and the electrochromic device on the basis of the second control signal outputted from the second control signal terminal, the control module controlling the conduction so that the conduction is realized later than the change in the power supply voltage signal.

The embodiments of the present disclosure can achieve at least one of the following advantageous effect and/or other advantageous effects:

The embodiments of the present disclosure provide the pixel circuit and the driving method thereof, the display panel and the display device. The pixel circuit comprises a data writing module, a drive module, a control module and an electrochromic device. The control terminal of the data writing module is connected with a first control signal terminal to receive a first control signal, the input terminal thereof is connected with a data signal terminal to receive a data signal, and the output terminal thereof is connected with the control terminal of the drive module. The data writing module is configured to provide the data signal outputted from the data signal terminal to the control terminal of the drive module under the control of the first control signal. The input terminal of the drive module is connected with a power supply voltage signal terminal to receive a power supply voltage signal. The drive module can be configured to drive the electrochromic device for colour development or colour fading according to the power supply voltage signal outputted from the power supply voltage signal terminal under the control of the data signal. The control terminal of the control module is connected with a second control signal terminal to receive a second control signal, the input terminal thereof is connected with the output terminal of the drive module, and the output terminal thereof is connected with one end of the electrochromic device. The other end of the electrochromic device is grounded. The control module can be configured to control the conduction between the drive module and the electrochromic device on the basis of the second control signal, and the control module controls the conduction so that the conduction is realized later than the change in the power supply voltage signal. Mutual collaboration of the above modules can make the turn-on of the control module later than the change in the power supply voltage signal, so as to effectively remove interference of the power supply voltage signal, avoid display fluctuations caused by the change in the power supply voltage signal, and further improve the display effect.

BRIEF DESCRIPTION OF DRAWINGS

To explain the technical solutions of the embodiments more clearly, the present disclosure provides the following drawings used for describing the embodiments. It should be appreciated that the following drawings are only related to some embodiments. Those skilled in the art can obtain other drawings according to these drawings without making inventive effort, and the other drawings also fall within the scope of the present invention.

FIG. 6 is a schematic view showing the flowchart of a method for driving the pixel circuit according to an embodiment.

DETAILED DESCRIPTION

To better clarify the object, technical solutions and advantages of the embodiments of the present disclosure, these embodiments will be described in detail with reference to the drawings. Apparently, the embodiments described herein are merely a part, not the whole, of the embodiments of the present invention. On the basis of the embodiments in the present disclosure, other embodiments obtained by those ordinarily skilled in the art without making inventive labour all fall within the scope of the present invention.

With reference to the drawings, the exemplary implementations of the pixel circuit and the driving method thereof, the display panel and the display device provided by the embodiments of the present disclosure will be explained in detail.

Figure 1:
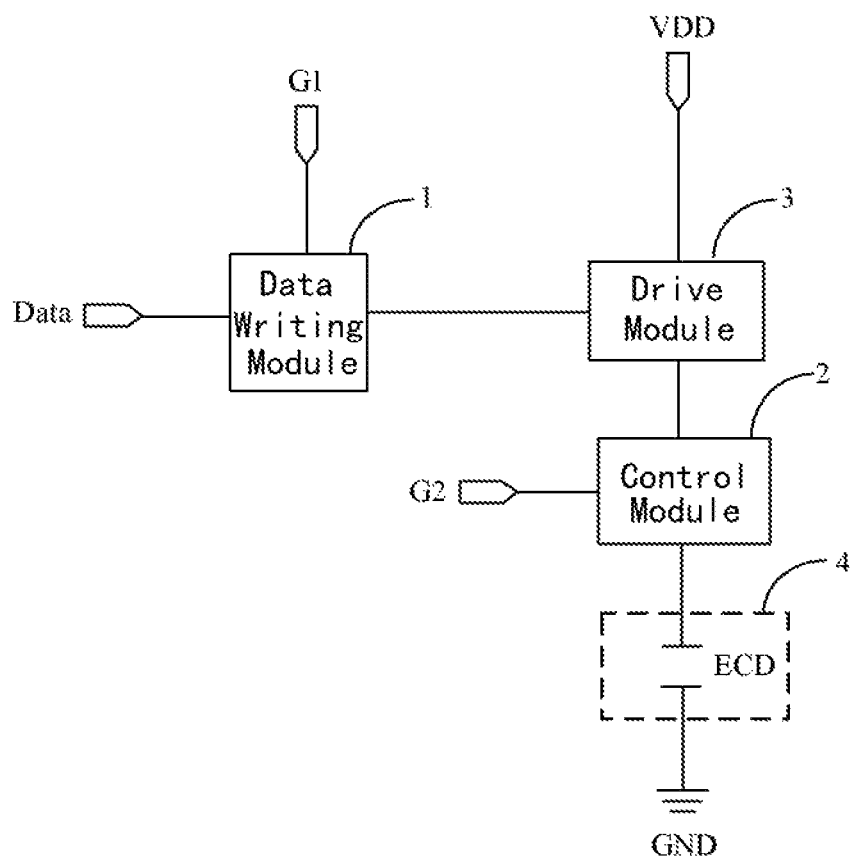
FIG. 1 is a structural schematic view of a pixel circuit according to an embodiment.

According to an aspect, there is provided a pixel circuit. As shown in FIG. 1, the pixel circuit may comprise a data writing module 1, a control module 2, a drive module 3 and an electrochromic device 4.

The control terminal of the data writing module 1 can be connected with a first control signal terminal G1 so as to receive a first control signal, the input terminal of the data writing module 1 can be connected with a data signal terminal Data so as to receive a data signal therefrom, and the output terminal of the data writing module 1 can be connected with the control terminal of the drive module 3. The data writing module 1 can be configured to provide the data signal outputted from the data signal terminal Data to the control terminal of the drive module 3 under the control of the first control signal outputted from a first control signal terminal G1.

The input terminal of the drive module 3 is connected with a power supply voltage signal terminal VDD so as to receive a power supply voltage signal. The drive module 3 can be configured to drive the electrochromic device 4 for colour development or colour fading according to the power supply voltage signal outputted from the power supply voltage signal terminal VDD under the control of the data signal.

The control terminal of the control module 2 is connected with a second control signal terminal G2 so as to receive a second control signal, the input terminal of the control module 2 is connected with the output terminal of the drive module 3, and the output terminal of the control module 2 is connected with one end of the electrochromic device 4. The other end of the electrochromic device 4 is grounded GND. The control module 2 can be configured to control the conduction between the drive module 3 and the electrochromic device 4 on the basis of the second control signal outputted from the second control signal terminal G2. The control module controls the conduction so that the conduction is realized later than the change in the power supply voltage signal.

In some embodiments, the pixel circuit comprises a data writing module, a control module, a drive module and an electrochromic device. The control terminal of the data writing module is connected with a first control signal terminal, the input terminal thereof is connected with a data signal terminal, and the output terminal thereof is connected with the control terminal of the drive module. The data writing module can be configured to provide the data signal outputted from the data signal terminal to the control terminal of the drive module under the control of the first control signal outputted from the first control signal terminal. The control terminal of the control module is connected with a second control signal terminal, the input terminal thereof is connected with the output terminal of the drive module, and the output terminal thereof is connected with one end of the electrochromic device, and the other end of the electrochromic device is grounded. The control module can be configured to control the conduction between the drive module and the electrochromic device on the basis of the second control signal outputted from the second control signal terminal. The input terminal of the drive module is connected with a power supply voltage signal terminal. The drive module can be configured to drive the electrochromic device for colour development or colour fading according to the power supply voltage signal outputted from the power supply voltage signal terminal under the control of the data signal. The control module controls the conduction so that the conduction is realized later than the change in the power supply voltage signal. Mutual collaboration of the above modules can make the turn-on of the control module later than the change in the power supply voltage signal, that is, the control module is in the OFF state when the power supply voltage signal changes from the low potential to the high potential or from the high potential to the low potential, such that the drive module is not conducted with the electrochromic device, which can effectively remove interference of the power supply voltage signal, avoid display fluctuations caused by the change in the power supply voltage signal, and further improve the display effect.

The present disclosure will be explained in detail with reference to the specific embodiments. It shall be noted that the embodiments are used to better explain the invention, but not to limit the invention at all.

It shall be noted that the first control signal, the second control signal and the data signal provided in the embodiments of the present disclosure can all be pulse signals changeable between high and low potential. The power supply voltage signal provided in the embodiments of the present disclosure can also be a signal changeable between high and low potential.

In some specific embodiments, in the pixel circuit, the display period can comprise a colour development stage and a colour fading stage, during which the power supply voltage signal is respectively maintained at a corresponding potential to realize colour development and colour fading. In an embodiment, the power supply voltage signal is maintained at a low potential in the colour development stage and at a high potential in the colour fading stage. For instance, in one display period, the power supply voltage signal can be maintained at a low potential within half of the display period and at a high potential within another half of the display period. In an embodiment, the data signal and the first control signal are converted into a switch-on potential at a time when the colour development stage and the colour fading stage get started. For instance, the data signal and the first control signal vary with the change in the power supply voltage signal, that is, the data signal and the first control signal vary while the power supply voltage signal changes from a low potential to a high potential or from a high potential to a low potential.

In an embodiment, the second control signal varies, e.g., is converted into a switch-on potential, in a predetermined time after the colour development stage and the colour fading stage get started. In an embodiment, the predetermined time is half of the duration in which the first control signal is maintained at the switch-on potential.

Figure 2:
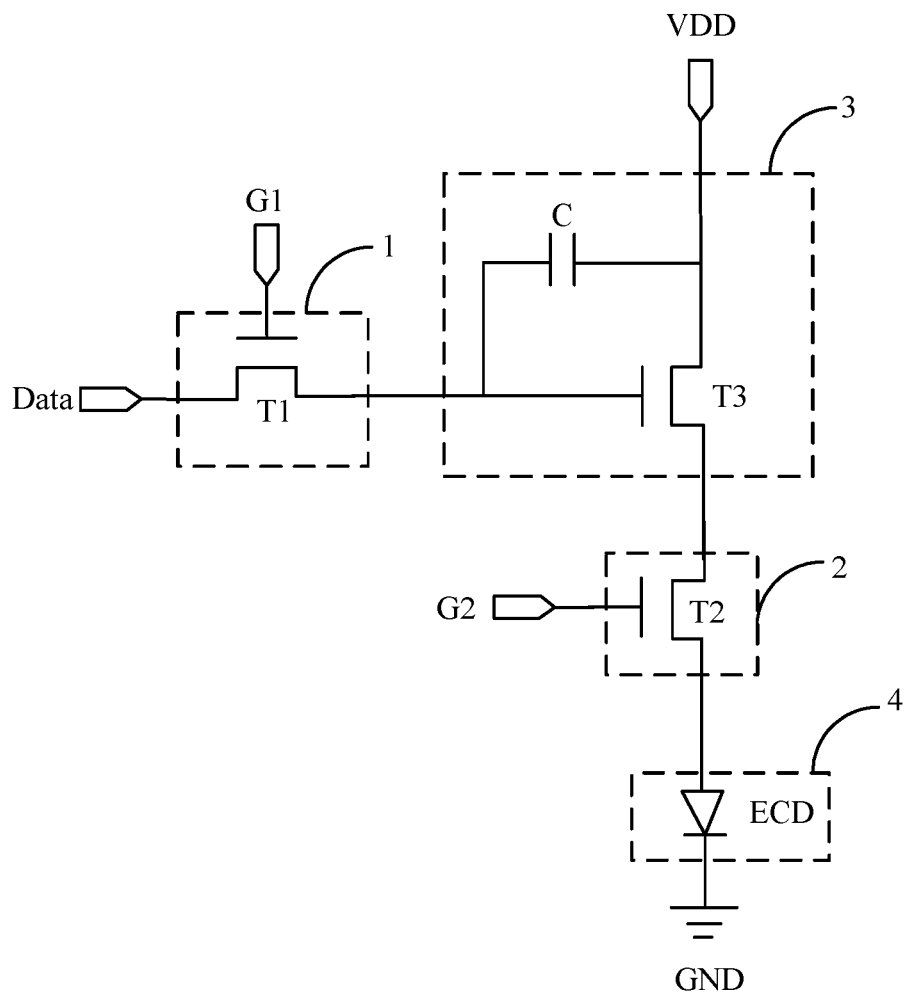
FIG. 2 is a structural schematic view of the specific circuit of the pixel circuit according to an embodiment.
Figure 3:
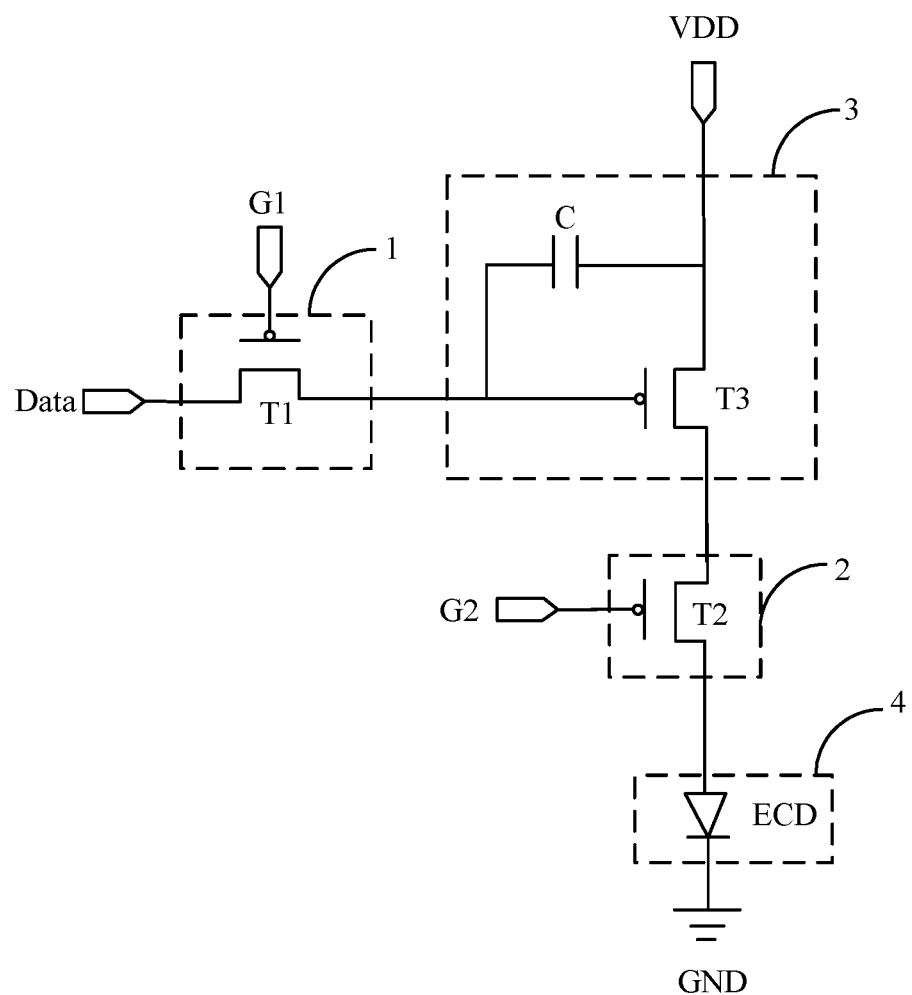
FIG. 3 is a structural schematic view of the specific circuit of a pixel circuit according to a further embodiment.

In a specific implementation, in the pixel circuit provided by some embodiments of the present disclosure, as shown in FIGS. 2 and 3, the data writing module 1 can comprise a first switching transistor T1, wherein the gate of the first switching transistor T1 is the control terminal of the data writing module 1, i.e., the gate is connected with the first control signal terminal G1; the source of the first switching transistor T1 is the input terminal of the data writing module 1, i.e., the source is connected with the data signal terminal Data; and the drain of the first switching transistor T1 is the output terminal of the data writing module 1, i.e., the drain is connected with the control terminal of the drive module 3.

Specifically, as shown in FIG. 2, the first switching transistor T1 can be an N-type transistor. When the first control signal is at a high potential, the first switching transistor T1 is in an ON state; and when the first control signal is at a low potential, the first switching transistor T1 is in an OFF state. Or, as shown in FIG. 3, the first switching transistor T1 can be a P-type transistor. When the first control signal is at a low potential, the first switching transistor T1 is in an ON state; and when the first control signal is at a high potential, the first switching transistor T1 is in an OFF state.

Specifically, when the first switching transistor T1 is in the ON state under the control of the first control signal terminal G1, the data signal outputted from the data signal terminal Data is transmitted to the control terminal of the drive module 3 by the first switching transistor T1, so as to control the turn-on of the drive module 3.

The above explains, by way of example, the specific structure of the data writing module in the pixel circuit. In a specific implementation, the specific structure of the data writing module is not limited to the above structure provided by the embodiment of the present disclosure, and may be of other structure known to those skilled in the art, which will not be limited herein.

In a specific implementation, in the pixel circuit provided by some embodiments of the present disclosure, as shown in FIGS. 2 and 3, the control module 2 can comprise a second switching transistor T2, wherein the gate of the second switching transistor T2 is the control terminal of the control module 2, i.e., the gate is connected with the second control signal terminal G2; the source of the second switching transistor T2 is the input terminal of the control module 2, i.e., the source is connected with the output terminal of the drive module 3; and the drain of the second switching transistor T2 is the output terminal of the control module 2, i.e., the drain is connected with one end of the electrochromic device 4.

Specifically, as shown in FIG. 2, the second switching transistor T2 can be an N-type transistor. When the second control signal is at a high potential, the second switching transistor T2 is in an ON state; and when the second control signal is at a low potential, the second switching transistor T2 is in an OFF state. Or, as shown in FIG. 3, the second switching transistor T2 can be a P-type transistor. When the second control signal is at a low potential, the second switching transistor T2 is in an ON state; and when the second control signal is at a high potential, the second switching transistor T2 is in an OFF state.

Specifically, when the second switching transistor T2 is in the ON state under the control of the second control signal terminal G2, the drive module 3 can be conducted with the electrochromic device 4 so as to transmit the drive signal outputted from the drive module to the electrochromic device 4 by the second switching transistor T2.

The above explains, by way of example, the specific structure of the control module in the pixel circuit. In a specific implementation, the specific structure of the control module is not limited to the above structure provided by the embodiment of the present disclosure, and may be of other structure known to those skilled in the art, which will not be limited herein.

In a specific implementation, in the pixel circuit provided by some embodiments of the present disclosure, as shown in FIGS. 2 and 3, the drive module 3 can comprise a third switching transistor T3 and a capacitor C, wherein the gate of the third switching transistor T3 is the control terminal of the drive module 3, i.e., the gate is connected with the output terminal (which may be the drain of the first switching transistor T1) of the data writing module 1; the source of the third switching transistor T3 is the input terminal of the drive module 3, i.e., the source is connected with the power supply voltage signal terminal VDD; and the drain of the third switching transistor T3 is the output terminal of the drive module 3, i.e., the drain is connected with the input terminal (which may be the source of the second switching transistor T2) of the control module 2. Two ends of the capacitor C can be electrically connected to the gate and the source of the third switching transistor T3, respectively.

Specifically, as shown in FIG. 2, the third switching transistor T3 can be an N-type transistor. When the output terminal of the data writing module 1 outputs a high potential, the third switching transistor T3 is in an ON state; and when the output terminal of the data writing module 1 outputs a low potential, the third switching transistor T3 is in an OFF state. Or, as shown in FIG. 3, the third switching transistor T3 can be a P-type transistor. When the output terminal of the data writing module 1 outputs a low potential, the third switching transistor T3 is in an ON state; and when the output terminal of the data writing module 1 outputs a high potential, the third switching transistor T3 is in an OFF state.

Specifically, when the first switching transistor T1 is turned on, the data writing module 1 provides the data signal outputted from the data signal terminal Data to the control terminal of the drive module 3, and the voltage of the data signal shall be greater than the threshold voltage Vth, so the third switching transistor T3 is turned on so as to transmit the power supply voltage signal outputted from the power supply voltage signal terminal VDD to the source of the second switching transistor T2. When the second switching transistor T2 is turned on, the electrochromic device 4 can be driven for colour development or colour fading according to the power supply voltage signal outputted from the power supply voltage signal terminal VDD.

The above explains, by way of example, the specific structure of the drive module in the pixel circuit. In a specific implementation, the specific structure of the drive module is not limited to the above structure provided by the embodiment of the present disclosure, and may be of other structure known to those skilled in the art, which will not be limited herein.

It shall be explained that the first switching transistor, the second switching transistor and the third switching transistor in some embodiments may be thin film transistors (TFTs), or metal oxide semiconductors (MOSs), which will not be limited herein. In a specific implementation, the source and the drain of these switching transistors may be functionally interchangeable according to the transistor type and input signal, which will not be differentiated herein.

In a specific implementation, for simplifying the manufacturing process, in the pixel circuit provided by some embodiments, the first switching transistor, the second switching transistor and the third switching transistor can all be N-type transistors or P-type transistors. The type of the above transistors can be decided according to actual conditions and will not be limited herein.

The working process of the pixel circuit provided by some embodiments will be described by taking the pixel circuit respectively shown in FIG. 2 and FIG. 3 as an example.

Figure 4:
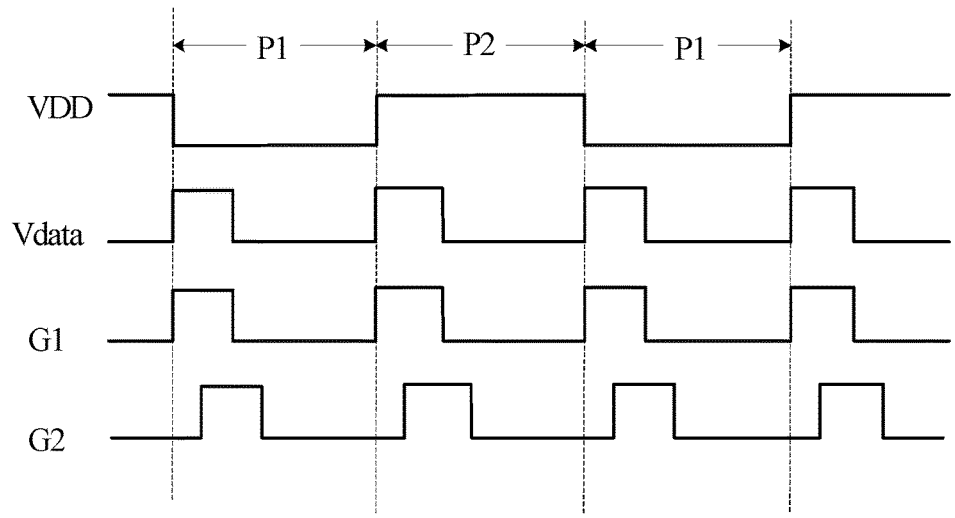
FIG. 4 is a circuit timing diagram of the pixel circuit shown in FIG. 2.

Firstly, the working process of the pixel circuit will be described by taking the structure of the pixel circuit shown in FIG. 2 as an example. In the pixel circuit shown in FIG. 2, all the switching transistors are N-type transistors that are turned on at a high potential and turned off at a low potential. FIG. 4 illustrates the exemplary timing diagram of various input signals of the pixel circuit shown in FIG. 2. Next, the two stages, P1 and P2, in the input timing diagram shown in FIG. 4 are selected as an example for detailed description. In the following description, 1 represents a high potential and 0 represents a low potential.

In the P1 stage (namely a colour development stage): the power supply voltage signal outputted from the power supply voltage signal terminal VDD is maintained at a low potential, i.e., VDD=0.

When the first control signal outputted from the first control signal terminal G1 is at a high potential, the data signal outputted from the data signal terminal Data is at a high potential and the second control signal outputted from the second control signal terminal G2 is at a low potential, i.e., G1=1, Data=1, G2=0, the first switching transistor T1 is in an ON state and the second switching transistor T2 is in an OFF state. At this time, the data signal is inputted into the gate of the third switching transistor T3 by the turned-on first switching transistor T1, so the third switching transistor T3 is turned on to input the power supply voltage signal into the drain of the third switching transistor T3. In this process, the capacitor C is always in a state of being charged, and the voltage difference between the two ends of the capacitor C is equal to Vgs of the third switching transistor.

Since the turn-on of the control module is later than the change in the power supply voltage, the change of the second control signal from a low potential to a high potential shall be delayed for a predetermined time. In an embodiment, the predetermined time can be half of the time in which the first control signal is at a high potential. In other words, the predetermined time can be half of the duration in which the first control signal is maintained at a turn-on potential.

After being delayed the predetermined time, the second control signal changes from a low potential to a high potential, and the first control signal and the data signal are still maintained at a high potential, i.e., G1=1, Data=1, G2=1. At this time, the first switching transistor T1, the second switching transistor T2 and the third switching transistor T3 are all in an ON state, so the power supply voltage signal terminal VDD is conducted with the electrochromic device 4, and the electrochromic device 4 can be driven for colour development according to the power supply voltage signal. After the pulse time, the first control signal and the data signal are changed to a low potential and then the second control signal is also changed to a low potential.

In the P2 stage (namely a colour fading stage): the power supply voltage signal outputted from the power supply voltage signal terminal VDD is maintained at a high potential, i.e., VDD=1.

When the P1 stage is turned into the P2 stage, i.e., when the power supply voltage signal changes from a low potential to a high potential, the first control signal outputted from the first control signal terminal G1 also changes from a low potential to a high potential, the data signal outputted from the data signal terminal Data also changes from a low potential to a high potential, but the second control signal outputted from the second control signal terminal G2 is maintained at a low potential, i.e., G1=1, Data=1, G2=0. At this time, the first switching transistor T1 is at an ON state, and the second switching transistor T2 is at an OFF state. Then, the data signal is inputted into the gate of the third switching transistor T3 by the turned-on first switching transistor T1, so the third switching transistor T3 is turned on to input the power supply voltage signal into the drain of the third switching transistor T3. In this process, when the power supply voltage signal changes from a low potential to a high potential, Vgs of the third switching transistor will vary. But since the second switching transistor T2 is in an OFF state, the change will not be transmitted to the electrochromic device, which can effectively remove interference of the power supply voltage signal, avoid display fluctuations caused by the change in the power supply voltage signal, and further improve the display effect.

After the predetermined time, the second control signal changes from a low potential to a high potential, and the first control signal and the data signal are still maintained at a high potential, i.e., G1=1, Data=1, G2=1. At this time, the first switching transistor T1, the second switching transistor T2 and the third switching transistor T3 are all in an ON state, so the power supply voltage signal terminal VDD is conducted with the electrochromic device 4, and the electrochromic device 4 can be driven for colour fading according to the power supply voltage signal. After the pulse time, the first control signal and the data signal are changed to a low potential and then the second control signal is also changed to a low potential.

Figure 5:
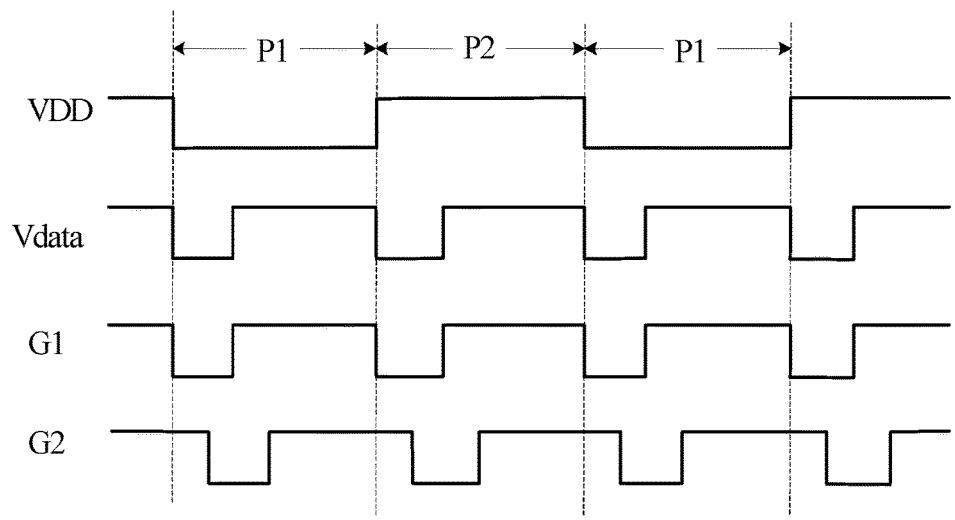
FIG. 5 is a circuit timing diagram of the pixel circuit shown in FIG. 3.

Then, the working process of the pixel circuit will be described by taking the structure of the pixel circuit shown in FIG. 3 as an example. In the pixel circuit shown in FIG. 3, all the switching transistors are P-type transistors that are turned on at a low potential and turned off at a high potential. FIG. 5 illustrates the exemplary timing diagram of various input signals of the pixel circuit shown in FIG. 3. Next, the two stages, P1 and P2, in the input timing diagram shown in FIG. 5 are selected as an example for detailed description. In the following description, 1 represents a high potential and 0 represents a low potential.

In the P1 stage (namely a colour development stage): the power supply voltage signal outputted from the power supply voltage signal terminal VDD is maintained at a low potential, i.e., VDD=0.

When the first control signal outputted from the first control signal terminal G1 is at a low potential, the data signal outputted from the data signal terminal Data is at a low potential and the second control signal outputted from the second control signal terminal G2 is at a high potential, i.e., G1=0, Data=0, G2=1, the first switching transistor T1 is in an ON state and the second switching transistor T2 is in an OFF state. At this time, the data signal is inputted into the gate of the third switching transistor T3 by the turned-on first switching transistor T1, so the third switching transistor T3 is turned on to input the power supply voltage signal into the drain of the third switching transistor T3. In this process, the capacitor C is always in a state of being charged, and the voltage difference between the two ends of the capacitor C is equal to Vgs of the third switching transistor.

Since the turn-on of the control module is later than the change in the power supply voltage, the change of the second control signal from a high potential to a low potential shall be delayed for a predetermined time. In an embodiment, the predetermined time can be half of the time in which the first control signal is at a low potential. In other words, the predetermined time can be half of the duration in which the first control signal is maintained at a turn-on potential.

After delaying the predetermined time, the second control signal changes from a high potential to a low potential, and the first control signal and the data signal are still maintained at a low potential, i.e., G1=0, Data=0, G2=0. At this time, the first switching transistor T1, the second switching transistor T2 and the third switching transistor T3 are all in an ON state, so the power supply voltage signal terminal VDD is conducted with the electrochromic device 4, and the electrochromic device 4 can be driven for colour development according to the power supply voltage signal. After the pulse time, the first control signal and the data signal are changed to a high potential and then the second control signal is also changed to a high potential.

In the P2 stage (namely a colour fading stage): the power supply voltage signal outputted from the power supply voltage signal terminal VDD is maintained at a high potential, i.e., VDD=1.

When the P1 stage is turned into the P2 stage, i.e., when the power supply voltage signal changes from a low potential to a high potential, the first control signal outputted from the first control signal terminal G1 also changes from a high potential to a low potential, the data signal outputted from the data signal terminal Data also changes from a high potential to a low potential, but the second control signal outputted from the second control signal terminal G2 is maintained at a high potential, i.e., G1=0, Data=0, G2=1. At this time, the first switching transistor T1 is at an ON state, and the second switching transistor T2 is at an OFF state. Then, the data signal is inputted into the gate of the third switching transistor T3 by the turned-on first switching transistor T1, so the third switching transistor T3 is turned on to input the power supply voltage signal into the drain of the third switching transistor T3. In this process, when the power supply voltage signal changes from a low potential to a high potential, Vgs of the third switching transistor will vary. But since the second switching transistor T2 is in an OFF state, the change will not be transmitted to the electrochromic device, which can effectively remove interference of the power supply voltage signal, avoid display fluctuations caused by the change in the power supply voltage signal, and further improve the display effect.

After delaying the predetermined time, the second control signal changes from a high potential to a low potential, and the first control signal and the data signal are still maintained at a low potential, i.e., G1=0, Data=0, G2=0. At this time, the first switching transistor T1, the second switching transistor T2 and the third switching transistor T3 are all in an ON state, so the power supply voltage signal terminal VDD is conducted with the electrochromic device 4, and the electrochromic device 4 can be driven for colour fading according to the power supply voltage signal. After the pulse time, the first control signal and the data signal are changed to a high potential and then the second control signal is also changed to a high potential.

According to another aspect, there is also provided a method for driving any pixel circuit as stated above. As shown in FIG. 6, the method comprises the steps of:

S601: in the colour development stage, a data writing module providing a data signal outputted from a data signal terminal to the control terminal of a drive module under the control of a first control signal outputted from a first control signal terminal; the drive module providing a power supply voltage signal outputted from a power supply voltage signal terminal to the input terminal of a control module under the control of the data signal so as to drive an electrochromic device for colour development; and a control module controlling the conduction between the drive module and the electrochromic device on the basis of a second control signal outputted from a second control signal terminal, the control module controlling the conduction so that the conduction is realized later than the change in the power supply voltage signal;

S602: in a colour fading stage, the data writing module providing the data signal outputted from the data signal terminal to the control terminal of the drive module under the control of the first control signal outputted from the first control signal terminal; the drive module providing the power supply voltage signal outputted from the power supply voltage signal terminal to the input terminal of the control module under the control of the data signal so as to drive the electrochromic device for colour fading; and the control module controlling the conduction between the drive module and the electrochromic device on the basis of the second control signal outputted from the second control signal terminal, the control module controlling the conduction so that the conduction is realized later than the change in the power supply voltage signal.

The method for driving the pixel circuit can effectively remove interference of the power supply voltage signal, avoid display fluctuations caused by the change in the power supply voltage signal, and further improve the display effect.

Based on the same concept, according to another aspect of the present disclosure, there is also provided a display panel comprising any pixel circuit provided by the present disclosure. Since the problem-solution theory of the display panel is similar to that of the pixel circuit, reference can be made to the implementation of the pixel circuit in the above embodiment for the implementation of the pixel circuit in the display panel, which will not be reiterated.

Based on the same concept, according to another aspect of the present disclosure, there is also provided a display device comprising the display panel provided by the present disclosure. Reference can be made to the description of the display panel for specific implementation of the display panel in the display device, which will not be reiterated. The display device can comprise any product or component having a display function, such as a mobile phone, a tablet, a TV, a display, a laptop, a digital photo frame, and a navigator. Those ordinarily skilled in the art can understand that the display device may also comprise other components, but they will not be reiterated because they are not the key parts of the present invention. Those ordinarily skilled in the art know that these other components shall not be used as limitations to the present invention. Reference can be made to the embodiments of the pixel circuit for the implementation of the display device, which will not be reiterated.

The present disclosure provides the pixel circuit and the driving method thereof, the display panel and the display device. In some embodiments, the pixel circuit may comprise: a data writing module, a control module, a drive module and an electrochromic device, wherein the control terminal of the data writing module is connected with a first control signal terminal, the input terminal thereof is connected with a data signal terminal, and the output terminal thereof is connected with the control terminal of the drive module. The data writing module can be configured to provide the data signal outputted from the data signal terminal to the control terminal of the drive module under the control of the first control signal outputted from the first control signal terminal. The control terminal of the control module is connected with a second control signal terminal, the input terminal thereof is connected with the output terminal of the drive module, and the output terminal thereof is connected with one end of the electrochromic device. The other end of the electrochromic device is grounded. The control module can be configured to control the conduction between the drive module and the electrochromic device on the basis of the second control signal outputted from the second control signal terminal. The input terminal of the drive module is connected with a power supply voltage signal terminal. The drive module can be configured to drive the electrochromic device for colour development or colour fading according to the power supply voltage signal outputted from the power supply voltage signal terminal under the control of the data signal. The control module controls the conduction so that the conduction is realized later than the change in the power supply voltage signal. Mutual collaboration of the above modules can make the turn-on of the control module later than the change in the power supply voltage signal, so as to effectively remove interference of the power supply voltage signal, avoid display fluctuations caused by the change in the power supply voltage signal, and further improve the display effect.

It can be understood that the above depictions are merely exemplary embodiments of the present invention, but the protection scope of the present invention is not limited thereto. It shall be noted that without departing from the spirit and principle of the present invention, those ordinarily skilled in the art can conceive of various variations or replacements, which shall fall within the protection scope of the present invention. Thus, the protection scope of the present invention shall be based on the protection scope of the appended claims.

What needs to be explained is that the above embodiments are only illustrated by way of the individual function modules division. In actual application, the above functions can be allocated to different functional modules as desired. The internal structure of the device can be divided into different functional modules so as to accomplish all or part of the functions as stated above. In addition, function(s) of the above one module can be achieved by a plurality of modules, and functions of the plurality of modules can be integrated into one module.

The term "and/or" used herein is only used to describe the connecting relations between objects connected thereby, which may be of three types. For instance, "A and/or B" can represent the following three situations: either A alone, or B alone, or both A and B. In addition, the character "/" used herein generally indicates that the former and the latter objects connected thereby is in a "or" relationship.

In the claims, any reference sign in parentheses should not be interpreted as a limitation to the claims. The term "comprise/include" does not exclude the presence of elements or steps other than those listed in the claims. The word "a" or "an" in front of elements do not exclude the presence of a plurality of such elements.

The invention claimed is:

1. A pixel circuit comprising a data writing module, a drive module, a control module and an electrochromic device; wherein,
   the control terminal of the data writing module is connected with a first control signal terminal so as to receive a first control signal, the input terminal thereof is connected with a data signal terminal so as to receive a data signal, and the output terminal thereof is connected with the control terminal of the drive module; the data writing module is configured to provide the data signal to the control terminal of the drive module under the control of the first control signal;
   the input terminal of the drive module is connected with a power supply voltage signal terminal so as to receive a power supply voltage signal, and the drive module is configured to drive the electrochromic device for colour development or colour fading according to the power supply voltage signal under the control of the data signal;
   the control terminal of the control module is connected with a second control signal terminal so as to receive a second control signal, the input terminal thereof is connected with the output terminal of the drive module, and the output terminal thereof is connected with one end of the electrochromic device, the other end of the electrochromic device is grounded, the control module is configured to control the conduction between the drive module and the electrochromic device on the basis of the second control signal,
   wherein, in a display period of the pixel circuit, the power supply voltage signal is maintained at a low potential within half of the display period and at a high potential within another half of the display period, the data signal and the first control signal vary while the power supply voltage signal changes, and the control module controls the conduction so that the conduction is realized later than the change in the power supply voltage signal.

2. The pixel circuit according to claim 1, wherein the display period of the pixel circuit comprises a colour development stage and a colour fading stage, during which the power supply voltage signal is respectively maintained at a corresponding potential to realize colour development and colour fading.

3. The pixel circuit according to claim 2, wherein the power supply voltage signal is maintained at a low potential in the colour development stage and at a high potential in the colour fading stage.

4. The pixel circuit according to claim 3, wherein the data signal and the first control signal are converted into a switch-on potential at a time when the colour development stage and the colour fading stage get started.

5. The pixel circuit according to claim 4, wherein the second control signal is converted into a switch-on potential in a predetermined time after the colour development stage and the colour fading stage get started.

6. The pixel circuit according to claim 5, wherein the predetermined time is half of the duration in which the first control signal is maintained at the switch-on potential.

7. The pixel circuit according to claim 2, wherein the data signal and the first control signal are converted into a switch-on potential at a time when the colour development stage and the colour fading stage get started.

8. The pixel circuit according to claim 7, wherein the second control signal is converted into a switch-on potential in a predetermined time after the colour development stage and the colour fading stage get started.

9. The pixel circuit according to claim 8, wherein the predetermined time is half of the duration in which the first control signal is maintained at the switch-on potential.

10. The pixel circuit according to claim 1, wherein the data writing module comprises a first switching transistor, wherein
    the gate of the first switching transistor is the control terminal of the data writing module, the source thereof is the input terminal of the data writing module, and the drain thereof is the output terminal of the data writing module.

11. The pixel circuit according to claim 10, wherein the first switching transistor is a N-type transistor or a P-type transistor.

12. The pixel circuit according to claim 1, wherein the control module comprises a second switching transistor, wherein
    the gate of the second switching transistor is the control terminal of the control module, the source thereof is the input terminal of the control module, and the drain thereof is the output terminal of the control module.

13. The pixel circuit according to claim 12, wherein the second switching transistor is a N-type transistor or a P-type transistor.

14. The pixel circuit according to claim 1, wherein the drive module comprises a third switching transistor and a capacitor, wherein
    the gate of the third switching transistor is the control terminal of the drive module, the source thereof is the input terminal of the drive module, and the drain thereof is the output terminal of the drive module
    two ends of the capacitor are electrically connected to the gate and the source of the third switching transistor, respectively.

15. The pixel circuit according to claim 14, wherein the third switching transistor is a N-type transistor or a P-type transistor.

16. A display panel comprising a pixel circuit according to claim 1.

17. A display device comprising a display panel according to claim 16.

18. A method for driving a pixel circuit according to claim 1, comprising the steps of:

in the colour development stage, a data writing module providing a data signal outputted from a data signal terminal to the control terminal of a drive module under the control of a first control signal outputted from a first control signal terminal; the drive module providing a power supply voltage signal outputted from a power supply voltage signal terminal to the input terminal of a control module under the control of the data signal so as to drive an electrochromic device for colour development; and a control module controlling the conduction between the drive module and the electrochromic device on the basis of a second control signal outputted from a second control signal terminal, the control module controlling the conduction so that the conduction is realized later than the change in the power supply voltage signal; and in a colour fading stage, the data writing module providing the data signal outputted from the data signal terminal to the control terminal of the drive module under the control of the first control signal outputted from the first control signal terminal; the drive module providing the power supply voltage signal outputted from the power supply voltage signal terminal to the input terminal of the control module under the control of the data signal so as to drive the electrochromic device for colour fading; and the control module controlling the conduction between the drive module and the electrochromic device on the basis of the second control signal outputted from the second control signal terminal, the control module controlling the conduction so that the conduction is realized later than the change in the power supply voltage signal.

\* \* \* \* \*